United States Patent
Henriksen

[15] 3,662,530
[45] May 16, 1972

[54] RAKING AND MULCHING MEANS FOR ROTARY MOWERS

[72] Inventor: Harold C. Henriksen, 1133 Oregon St., Racine, Wis. 53405

[22] Filed: Dec. 15, 1970

[21] Appl. No.: 98,424

[52] U.S. Cl. ............................................................56/295
[51] Int. Cl. .....................................................A01d 55/18
[58] Field of Search.................................................56/295

[56] References Cited

UNITED STATES PATENTS

| | | |
|---|---|---|
| 2,891,369 | 6/1959 | Rietz....................................56/295 X |
| 3,103,093 | 9/1963 | House, Jr..............................56/295 |
| 2,071,872 | 2/1937 | Cockburn ........................56/295 UX |
| 2,836,021 | 5/1958 | Wood et al. .............................56/295 |

*Primary Examiner*—Louis G. Mancene
*Assistant Examiner*—J. N. Eskovitz
*Attorney*—Axel H. Johnson

[57] ABSTRACT

A raking and mulching means to be combined with the rotating member of a rotary mower so as to permit raking and mulching of leaves and other matter while also cutting the grass. If desired, this means can be substituted for all of the cutting blades when merely mulching or pulverizing. (Mulching is to be interpreted as being the reducing of leaves grass and such matter to small particles).

4 Claims, 6 Drawing Figures

PATENTED MAY 16 1972 3,662,530

INVENTOR
HAROLD C. HENRIKSEN
BY
Axel H. Johnson, agt

RAKING AND MULCHING MEANS FOR ROTARY MOWERS

BACKGROUND OF THE INVENTION

1. Field of the Invention

This invention concerns a mulching means that can be combined with cutting means on a rotary mower in order to mulch or pulverize matter such as leaves and twigs, and to distribute such matter upon the grass area.

2. Description of the Prior Art

The known prior art comprises the following patents:

| | |
|---|---|
| Beaszley | Re. 18,944 |
| Poynter | 2,245,821 |
| Brown | 2,957,295 |
| Ericksen | 2,983,057 |
| Russell et al. | 3,157,015 |

The known prior art fails to embrace means to provide a rotary mower with a mulching means that can supplement the regular cutting means, and return the resulting mulch to the lawn. In the absence of the mulching process the coarse grass and partly-cut leaves, if allowed to lie on the grass in large quantities may cause damage in the form of fungus.

SUMMARY

This invention provides a means of mulching and pulverizing clippings and leaves into small particles that can be distributed on the lawn and which will settle toward the roots of the grass. An object, therefore, of this invention is to provide a mulching means that can replace some or all of the cutting blades of a rotary mower.

Further objects and advantages of this invention will become apparent from a consideration of the following detailed description taken in connection with the accompanying drawing wherein an embodiment of the invention is shown. It is, however, to be understood that the invention is not limited to the details disclosed, but includes all such variations as fall within the spirit of the invention.

Referring to the drawing.

Figure 1:
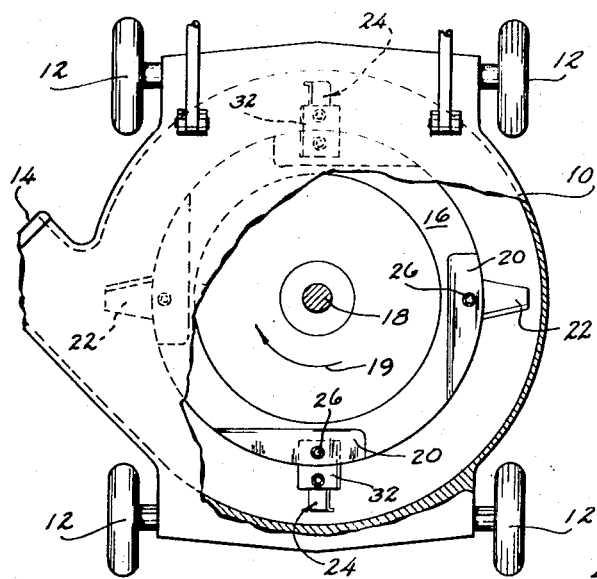
FIG. 1 is a plan view of a typical rotary mower with parts broken away and embracing this invention.

The conventional rotary mower of FIG. 1 comprises the housing 10 provided with transport wheels 12. An outlet 14 permits grass and mulched material to be distributed over the grass.

A rotating member, or disk 16 is supported in housing 10 on a shaft 18, which is journalled for rotation in the direction of arrow 19, by a suitable power means, not shown, and in a plane of rotation normal to the axis of rotation. Member 16 has portions such as 20 directed at an angle relative to the plane of rotation of the member 16, and which portions function as a fan to provide the "lift" to raise the grass and other material to be mulched, into engagement with the cutting blades 22 and the mulching blades 24. Cutting blades 22 in this instance are of the customary type, and are bolted to the portions 20 by bolts 26.

Figure 3:
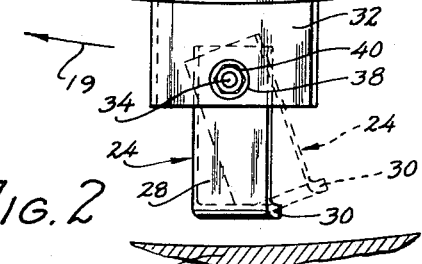
FIG. 3 is an elevational view of FIG. 2.
Figure 4:
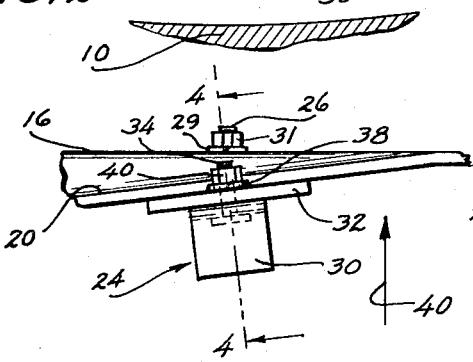
FIG. 4 is a section taken at 4—4 of FIG. 3.

Mulching blades 24 are preferable of steel and comprise an outwardly-directed portion 28 which terminates in a downwardly-extending mulching finger portion 30. A support plate 32 provides the support for blade 24 and is secured to the portion 20 at the underside thereof by a bolt 26 having the usual lock washer 29 and a nut 31. Blade 24 is pivotally mounted, in this instance, on the underside of plate 32 by a pivot bolt 34 which has an enlarged portion 36 to permit blade 24 to pivot freely in the event that it strikes an obstruction. Lock washer 38 and nut 40 secure bolt 34 in place. Inasmuch as plate 32 is secured to the portion 20 the plate will also add to the "lift" supplied by the portions 20, which lift is directed upwardly as shown by the arrow 40 of FIG. 3. Thus the rotation of the disk 16 will tend to lift leaves and grass clippings into engagement with the blades 22 and 24, and so reduce such material to a fineness that permits it to settle toward the roots of the grass to provide the mulch.

Figures 5, 6:
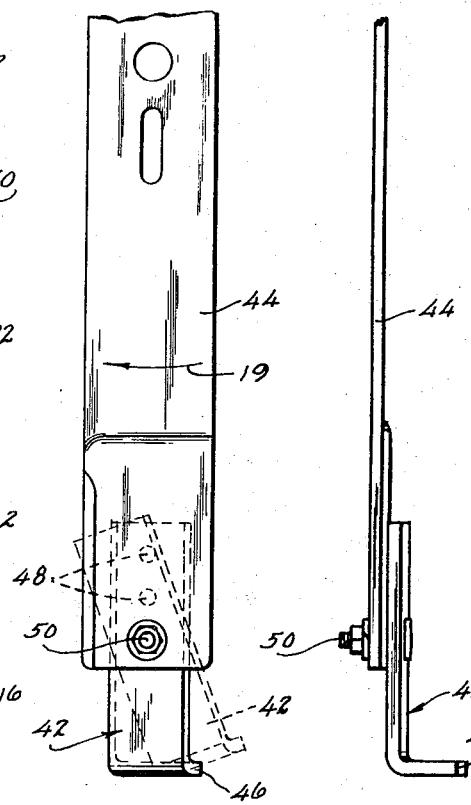
FIG. 5 is a plan view of the mulching or pulverizing blade assembled on a mower blade of another design.
FIG. 6 is an elevational view of the assembly of FIG. 5.
Figure 2:
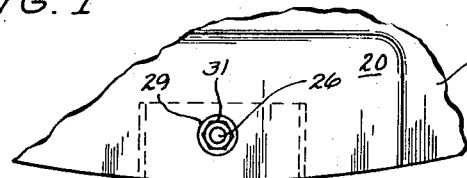
FIG. 2 is an enlargement of a portion of FIG. 1, showing the mulching blade of this invention.

It is also within the purview of this invention to provide mulching blades such as 42 to be mounted on each end of a mower blade such as 44, a portion of which is shown in FIG. 5 and 6; only one mulching blade 42 being shown. Blades 42 have downwardly extending mulching portions 46 that engage the material being mulched or pulverized. Inasmuch as arms 44 are made in various lengths to suit different mowers, blades 42 are provided with a series of holes 48 to permit mounting of the blades on the various blades 44. The bolt assembly 50 is similar to that employed with blades 24 and indicated as 34.

The above being a complete description of an illustrative embodiment of the invention, what is claimed as new and desired to be secured by Letters Patent of the United States is:

1. A combined mowing and mulching means for a rotary mower to mulch leaves and other matter while mowing grass, said mower having a downwardly-open housing and a rotating member in said housing, said rotating member having a plurality of alternate cutting means and mulching means attached thereto, said mulching means being discrete and peripherally-positioned from said cutting means and comprising a blade pivoted to said rotating member, said blade terminating in a downwardly-directed finger portion.

2. A mulching means as set forth in claim 1, in which a discrete support plate is secured integrally to said rotating member, and said mulching means is pivoted to said support plate.

3. A mulching means as set forth in claim 2, in which said support plate is positioned in a plane angularly disposed to the plane of rotation of said rotating member.

4. A mulching means as set forth in claim 1, in which said downwardly-directed finger portion is of a rectangular cross section.

* * * * *

UNITED STATES PATENT OFFICE
CERTIFICATE OF CORRECTION

Patent No. 3,662,530      Dated May 16, 1972

Inventor(s) Harold C. Henriksen

It is certified that error appears in the above-identified patent and that said Letters Patent are hereby corrected as shown below:

On the cover sheet [72] should read

-- Inventor: Harold C. Henriksen, 2340 Thor Avenue, Racine, Wis. 53405 --.

Signed and sealed this 7th day of November 1972.

(SEAL)
Attest:

EDWARD M. FLETCHER, JR.
Attesting Officer

ROBERT GOTTSCHALK
Commissioner of Patents